(12) United States Patent
De Vaan et al.

(10) Patent No.: US 10,935,942 B2
(45) Date of Patent: Mar. 2, 2021

(54) CONTROLLING A NETWORK CONNECTED LIGHTING DEVICE

(71) Applicant: SIGNIFY HOLDING B.V., Eindhoven (NL)

(72) Inventors: Adrianus Johannes Stephanus Maria De Vaan, 'S-Hertogenbosch (NL); Leendert Teunis Rozendaal, Valkenswaard (NL); Marco Haverlag, Mierlo (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 159 days.

(21) Appl. No.: 15/529,345

(22) PCT Filed: Nov. 10, 2015

(86) PCT No.: PCT/EP2015/076113
§ 371 (c)(1),
(2) Date: May 24, 2017

(87) PCT Pub. No.: WO2016/083113
PCT Pub. Date: Jun. 2, 2016

(65) Prior Publication Data
US 2017/0277147 A1    Sep. 28, 2017

(30) Foreign Application Priority Data
Nov. 24, 2014    (EP) ..................................... 14194448

(51) Int. Cl.
*G05B 15/02*    (2006.01)
*G08C 17/02*    (2006.01)
(Continued)

(52) U.S. Cl.
CPC .............. *G05B 15/02* (2013.01); *F24F 11/30* (2018.01); *F24F 11/54* (2018.01); *F24F 11/56* (2018.01);
(Continued)

(58) Field of Classification Search
None
See application file for complete search history.

(56) References Cited

U.S. PATENT DOCUMENTS 8,380,168 B2 *    2/2013    Tanaka .................... A63F 13/12
                                                370/328
2005/0239497 A1 *  10/2005    Bahl .................. H04L 12/5692
                                                455/552.1
(Continued)

FOREIGN PATENT DOCUMENTS

CN    101119314 A    2/2008
CN    101534176 A    9/2009
(Continued)

OTHER PUBLICATIONS

Langhammer, Nils, et al., "Performance Evaluation of Wireless Home Automation Networks in Indoor Scenarios," IEEE Transactions on Smart Grid, vol. 3, No. 4, Dec. 2012 (10 pages).

*Primary Examiner* — Jason Lin
(74) *Attorney, Agent, or Firm* — Meenakshy Chakravorty (57) ABSTRACT

A control device (3) for controlling a lighting system (19) over a communication system comprising one or more networks, the lighting system comprising at least one lighting device (1a, 1b, 1c). The control device comprises: multiple transmitters (4a, 4b, 4c, 4d, 4e) each for transmitting to the lighting system via a different respective interface (7a, 7b, 16, 17, 51) of the communication system; A and a controller (95) configured to use each of a plurality of the transmitters to transmit a respective message to the lighting system via a different respective path, each path comprising
(Continued)

a different respective one of the interfaces and not any of the others. Each of the messages invokes feedback from the lighting system to the control device if received and/or if executed by the lighting system. The controller compare the paths in dependence on the feedback, and based thereon to select which of the interfaces to use to transmit subsequent lighting control commands to the lighting system for controlling the lighting system.

10 Claims, 2 Drawing Sheets (51) Int. Cl.
| | |
|---|---|
| G08C 23/04 | (2006.01) |
| F24F 11/54 | (2018.01) |
| F24F 11/56 | (2018.01) |
| H05B 47/19 | (2020.01) |
| F24F 11/62 | (2018.01) |
| F24F 11/30 | (2018.01) |
| H04L 12/28 | (2006.01) |

(52) U.S. Cl.
CPC ............. *F24F 11/62* (2018.01); *G08C 17/02* (2013.01); *G08C 23/04* (2013.01); *H05B 47/19* (2020.01); *G08C 2201/42* (2013.01); *H04L 12/2803* (2013.01)

(56) References Cited

U.S. PATENT DOCUMENTS

| | | | | |
|---|---|---|---|---|
| 2007/0008065 | A1* | 1/2007 | Shearer | G08C 23/04 340/3.9 |
| 2007/0099643 | A1* | 5/2007 | Almeda | H04M 11/007 455/519 |
| 2007/0105623 | A1* | 5/2007 | Tanaka | A63F 13/12 463/29 |
| 2007/0153815 | A1* | 7/2007 | She | H04L 12/4035 370/401 |
| 2008/0310419 | A1 | 12/2008 | Bansal et al. | |
| 2010/0141153 | A1* | 6/2010 | Recker | H05B 33/0803 315/149 |
| 2012/0082461 | A1* | 4/2012 | Meyer | G08C 17/02 398/106 |
| 2014/0068116 | A1 | 3/2014 | Kim et al. | |
| 2014/0244063 | A1* | 8/2014 | Davis | H05B 37/0272 700/297 |
| 2015/0137703 | A1* | 5/2015 | Hartman | G08G 1/087 315/294 |
| 2016/0277202 | A1* | 9/2016 | Davis | H04L 67/125 |

FOREIGN PATENT DOCUMENTS

| | | |
|---|---|---|
| EP | 1589781 A2 | 10/2005 |
| EP | 2262338 A2 | 10/2010 |
| EP | 2733686 A2 | 5/2014 |
| JP | 2001169368 A | 6/2001 |
| WO | 200157489 A1 | 8/2001 |

* cited by examiner

Figure 1

CONTROLLING A NETWORK CONNECTED LIGHTING DEVICE

CROSS-REFERENCE TO PRIOR APPLICATIONS

This application is the U.S. National Phase application under 35 U.S.C. § 371 of International Application No. PCT/EP2015/076113, filed on Nov. 10, 2015, which claims the benefit of European Patent Application No. 14194448.8, filed on Nov. 24, 2014. These applications are hereby incorporated by reference herein.

TECHNICAL FIELD

The present disclosure relates to controlling a lighting system over a communication system comprising one or more networks, the lighting system comprising one or more lighting devices such as one or more luminaires for illuminating a room or other environment.

BACKGROUND

Most environments are provided with one or more lighting devices in the form of one or more luminaires for illuminating the environment so that occupants can find their way about and/or see objects within the environment, typically flooding the environment with light generally, or at least part of it. Other types of lighting device include for example luminaires for providing lighting effects, e.g. as part of a light show or stage lighting.

Traditionally the lights are controlled by means of the user manually pressing a light switch or turning a dimmer switch. Nowadays, lights can also be controlled remotely via another device such as a user terminal, and even a mobile user terminal such as a smartphone, tablet or laptop computer. To do so (e.g. in response to a user input), the controlling device transmits one or more lighting control commands via a network, destined for a receive-side control unit of the lighting system. This involves a suitable transmitter of the controlling device which is used to send the lighting control commands to an interface of the network, from whence the command message is directed onwards over the network to its destination.

For example, one possibility is to control the lights via Wi-Fi. In this case the network comprises at least an interface in the form of a wireless access point configured to operate in accordance with a Wi-Fi communications standard, and the controlling device (e.g. user terminal) comprises a corresponding transmitter configured to connect to the access point using Wi-Fi. The controlling device can then send lighting control commands to the lighting system via this connection with the access point, the command messages being send onwards from the access point to the lighting system's own controller.

In another example, the lights may be controlled via another short-range RF access technology in the form of ZigBee. In this case a conventional access point may not involved, e.g. the transmitter on the controlling device may be configured to use a ZigBee communications standard to send one or more control commands directly to a corresponding ZigBee interface of the lighting system (e.g. direct to a local control unit of a particular luminaire) without any intermediate nodes, or alternatively the command message may be sent via one or more intermediate nodes in a mesh of ZigBee devices.

SUMMARY

In a connected lighting system, there could in fact be multiple interfaces present at once for controlling the system. As an example, a lighting system could be controlled over Wi-Fi (e.g. via a router), via ZigBee (e.g. direct to lamp) or in future systems using Bluetooth, RFID, etc. In such a scenario, the controlling device or its user has to determine which interface to use. However, without any further mechanism in place, then there is little or no basis provided for making this determination. E.g. the device may be set to automatically use Wi-Fi by default unless the user goes into a settings menu to select another default.

It would be desirable to provide the possibility of controlling of a network connected lighting system via multiple paths towards the lighting system while also enabling control of the lighting in a fast, hassle free and user friendly way; e.g. enabling a user in a particular room or environment to control the network connected lighting in that particular room or environment in a fast, hassle free and user friendly way.

According to one aspect disclosed herein, there is provided a control device for controlling a lighting system over a communication system comprising one or more networks. The lighting system comprises at least one lighting device, and the control device may for example take the form of a user terminal such as a mobile user terminal, e.g. a smartphone, tablet or laptop computer. Whatever form it takes, the control device comprises multiple transmitters each for transmitting to the lighting system via a different respective interface of the communication system. In embodiments, each of the interfaces may use a different respective access technology. In embodiments, each of the transmitters may be a wireless transmitter and each of the respective interfaces may be a wireless interface. For example, some or all of the wireless interfaces may each comprise a different respective one of: a local wireless interface (e.g. a Wi-Fi interface, a ZigBee interface, a Bluetooth interface, a Z-Wave interface and/or a JenNet-IP interface); a mobile cellular interface (e.g. a 3GPP interface), or a near-field communication interface (e.g. an RFID interface).

Furthermore, the control device (e.g. user terminal) comprises a controller (e.g. controller application) configured to use each of a plurality of the transmitters to transmit a respective message to the lighting system via a different respective path, each path comprising a different respective one of the interfaces (and not any others of the interfaces). Each of the messages invokes feedback from the lighting system to the control device if received and/or if executed by the lighting system, and the controller is configured to compare the paths in dependence on the feedback (e.g. in dependence on the information provided by the feedback, or in dependence on whether or not feedback was received). Based on this comparison, the controller then selects which of the interfaces to use to transmit subsequent lighting control commands to the lighting system for controlling the lighting system.

In embodiments, each of said messages (i.e. the messages based one which the feedback is obtained) may itself comprise a lighting control command for controlling the lighting system. In embodiments, each of said messages may comprise a respective instance of the same lighting control command.

Thus there is provided a "firing" mechanism for controlling the one or more lighting devices in a lighting system such that commands are fired via various network paths towards the devices to be controlled, with a feedback system to detect which paths leads to the desired results. As such, various paths can be identified to control the lighting system in a particular room or the like, and a most favorable path can be derived.

In embodiments, the feedback may comprise confirmation that the lighting control command was successfully received and/or successfully executed by the lighting system. In this case the comparison comprises comparing whether the confirmation was received back by the control device in response to the transmission over the respective paths. I.e. the performance of the comparison in dependence on the feedback may comprise comparing a lack of feedback on one path with the fact that feedback was successfully received in relation to another.

Alternatively or additionally, the feedback may comprise information relating to the transmission of the respective message over the respective path. In this case the comparison comprises comparing the information received back in response to the transmission of the respective message over two or more of the respective paths. For example, said information may comprise one or more of: (a) information on a timing of the transmission of the respective message over the respective path, (b) information on an error rate experienced the transmission of the respective message over the respective path, and/or (c) information tracing the respective path travelled by the respective message.

In embodiments, the controller may be configured to time out if no feedback is received in response to any of said messages. The controller may be configured to ask a user for manual feedback in event of said time out.

In the case where the controlling device is a user terminal, one, some or all of the control commands mentioned above may be instigated by user in response to user inputs entered through a user interface of the user terminal.

In embodiments, in addition to said feedback, the controller may be configured to receive additional information from one or more of the interfaces as to an availability of one or more of the interfaces and/or one or more capabilities of one or more of the interfaces, and/or to receive additional information as to one or more capabilities of the lighting system.

In embodiments, the controller may be configured to select which of the interfaces to use to transmit the subsequent lighting control commands to the lighting system in further dependence on said additional information.

Alternatively or additionally, the controller may be configured to select said paths in dependence on any of the above-mentioned additional information (i.e. select which of the paths to obtain feedback in relation to).

Alternatively or additionally, the controller may be configured to determine a manner in which to connect to the selected interface in dependence on any of the abovementioned additional information (e.g. which software version or protocol version to use).

Alternatively or additionally, the controller may be configured to adapt the user interface in dependence on which of the interfaces is selected.

Alternatively or additionally, the controller may be configured to adapt the user interface in dependence on any of the above-mentioned additional information.

According to another aspect disclosed herein, there is provided a method of controlling a lighting system over a communication system comprising one or more networks, the lighting system comprising at least one lighting device, and the method comprising: transmitting a respective message to the lighting system via each of a plurality of different paths, each path comprising a different respective interface of the communication system and not any others of the interfaces; receiving feedback invoked by one or more of the messages, wherein each of the messages invokes feedback from the lighting system to the control device if received and/or if executed by the lighting system; comparing the paths in dependence on the feedback; and based on said comparison, selecting which of the interfaces to use to transmit subsequent lighting control commands to the lighting system for controlling the lighting system.

In embodiments, the method may further comprise steps in accordance with any of the device or system features disclosed herein.

A computer program for controlling a lighting system over a communication system comprising one or more networks, the lighting system comprising at least one lighting device. The computer program comprises code embodied one or more computer-readable storage media (e.g. a CD, hard disk, memory stick, or made available for download from a server) and configured so as when run on a control device to perform operations of: transmitting a respective message to the lighting system via each of a plurality of different paths, each path comprising a different respective interface of the communication system but not any others of the interfaces; receiving feedback invoked by one or more of the messages, wherein each of the messages invokes feedback from the lighting system to the control device if received and/or if executed by the lighting system; comparing the paths in dependence on the feedback; and based on said comparison, selecting which of the interfaces to use to transmit subsequent lighting control commands to the lighting system for controlling the lighting system.

In embodiments, the computer program may be further configured to perform operations in accordance with any of the device features disclosed herein.

Furthermore, while the above aspects provide feedback from the lighting system to the control device (e.g. user terminal), another possibility is that the lighting system may alternatively or additionally receive feedback from the control device, and use this feedback to select which path to use to send messages back in the other direction to the control device.

Hence according to yet another aspect of the present disclosure, there may be provided lighting system comprising at least one lighting device, wherein the lighting system is controlled by a control device over a communication system comprising one or more networks, the lighting system comprising: a controller configured to use each of a plurality of the transmitters to transmit a respective message to the control device via a different respective path, each path comprising a different respective one of a plurality of interfaces between the communication system and the control device but not any others of said interfaces; wherein each of the messages invokes feedback from the control device to the lighting system if received by the control device; and wherein the controller is configured to compare the paths in dependence on the feedback, and based thereon to select which of the interfaces to use to transmit subsequent messages to the control device.

There may also be provided a corresponding method performed from the perspective of the lighting system, and a corresponding computer program for operating the lighting system. In embodiments, any of the feedback features described in relation to feedback form the lighting system to the control device (e.g. user terminal) may also apply in relation to the feedback in the other direction from the control device to the lighting system.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

The following discloses a technique whereby multiple channels are used to send a control command from a control device (e.g. smartphone) to a lighting system, wherein the lighting system provides feedback to the control device. This feedback concerns, for example, timing information (e.g. which interface is the fastest), error rates (e.g. which interface has seen the least packets dropped), etc. The feedback can then be used by the control device to determine which (wireless) interface to use, for example which interface is optimal given the situation.

Additionally, as part of initial communications (e.g. a handshake protocol) one or more of the interfaces may provide information on the interfaces available. This can include version information for example.

A benefit of such a system is that multiple paths are available to suit a variety of control devices, and an optimal path may be selected. As an example, a smart phone might start communicating with the lighting system over Wi-Fi and then determine that the system can also be interfaced over ZigBee. It is determined that version X of a protocol is available, which the phone supports. Commands can then be sent over both Wi-Fi and ZigBee, after which feedback is received from the lighting system. Based on the feedback an interface (either Wi-Fi or ZigBee) is selected for further communications.

Figure 1:
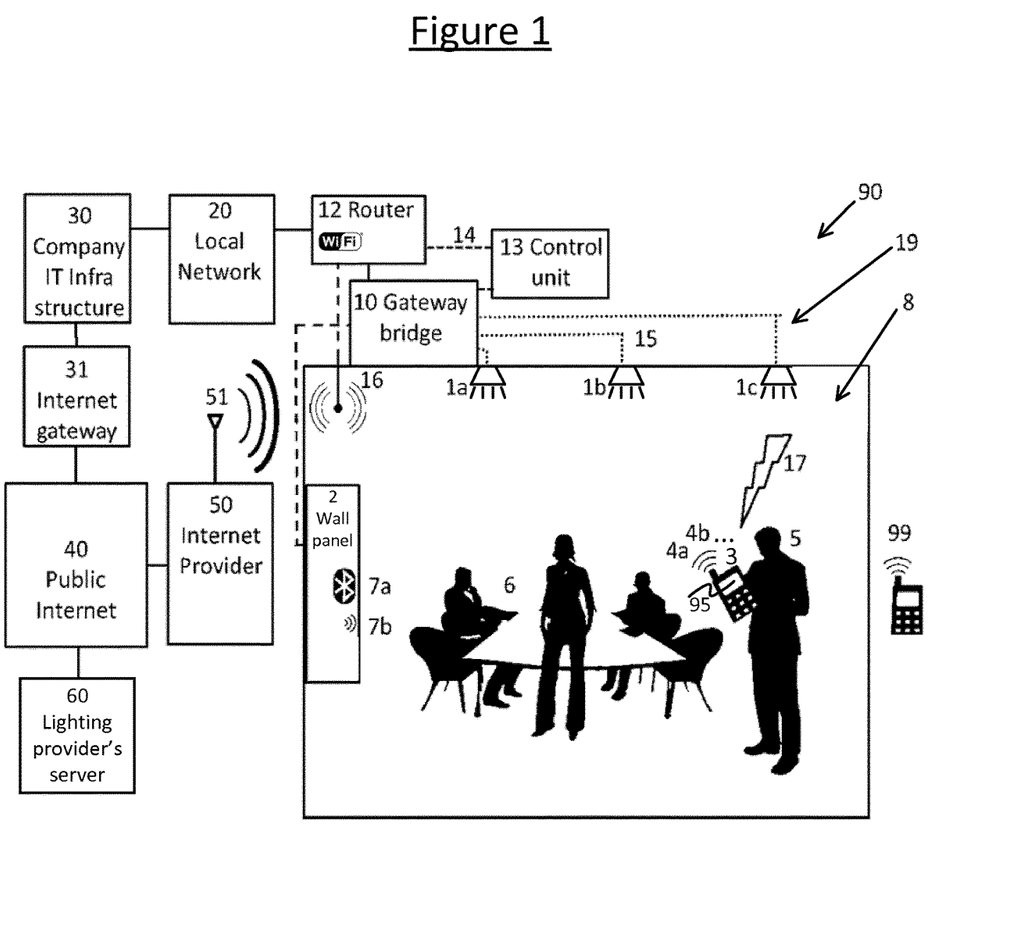
FIG. 1 is a schematic diagram of a system comprising a networked lighting system.

FIG. 1 shows a diagram of system 90 comprising a lighting system 19 installed or otherwise disposed in an environment 8. The environment 8 may comprise an indoor environment such as one or more rooms, halls and/or corridors of a building; and/or an outdoor environment such as a garden or park; and/or a partially covered environment such as a gazebo, porch or stadium; or any combination of these, e.g. the buildings and/or outdoor spaces of a campus or mall. By way of example, the techniques disclosed herein may be have an application to intelligent lighting systems in open plan offices, cell offices, meeting rooms, conference rooms, hotel rooms and other hospitality applications, doctors' offices, waiting rooms, warehouses, and various other indoor or outdoor applications. Further, the implementation of the disclosed techniques are not only features that can be "sold as is", but can also offer building blocks for control in several service business models, e.g. meeting rooms, hotel rooms, restaurants, shops, hotels, museums, hospitals, public environments, events, exhibitions, public transport, and industrial environments.

The lighting system 19 comprises one or more lighting devices 1 in the form of one or more luminaires for illuminating the environment 8. The lighting devices 1 may be fixedly installed in the environment 8, e.g. mounted on one or more ceilings or walls; and/or the lighting devices 1 may comprise free-standing units. The following will be described in terms of the illustrated example in which three lighting devices 1a, 1b, 1c are installed in a single room 8, but it will be appreciated that the techniques described may apply to other numbers of devices in other environments as well. For example, such techniques may also be used in relation to other, less complex systems, such as a single network connected lamp in a home environment.

The room 8 or other environment is—at least on occasion—occupied by a user 5, and potentially one or more other occupants 6, either at the same time and/or different times. The lighting system 19 is controlled from an application 95 running on a user terminal 3 of the user 5, e.g. a mobile user terminal such as a smartphone, tablet or laptop computer. Hence the controller functionality 95 of the user terminal 3 is implemented in software stored on one or more storage media of the user terminal 3 and arranged for execution on one or more processors of the user terminal 3 (though in alternatively in other embodiments a hardware implementation of this functionality is not excluded, or a combination of hardware and software). The controller application 95 is configured so as when run on the user terminal 3 to present the user 5 with a user interface via one or more I/O modules of the user terminal 3, e.g. a touch-screen. Particularly, the user interface provides the user 5 with one or more user-operable controls through which the user 5 can control the light emitted by one or more of the lighting devices 1a, 1b, 1c of the lighting system 19, e.g. in order to turn the lights 1 or a specific lighting device on or off, or to dim the lights 1 or a specific lighting device up or down, or to change a color of the emitted lights.

In response to such a user input, the lighting control application 95 generates one or more corresponding lighting control commands which it transmits from the user terminal 3 to the lighting system 19. Specifically, the lighting system 19 comprises at least one receive-side control unit 13 for controlling the lights 1, and the application on the user terminal 3 transmits the one or more lighting control commands to the lighting control unit 13 of the lighting system. The lighting system's control unit 13 executes the commands to perform the relevant lighting control function (e.g. turn on or off, dim up or down, or change color).

The control unit 13 may be implemented in software stored in one or more storage media and arranged to be executed on one or more processors, or alternatively may be implemented in hardware or any combination of hardware and software. It may be a centralized unit or may be implemented in a distributed fashion. In embodiments (as illustrated) a gateway 10 is connected between the receive-side control unit 13 and the lighting devices 1a, 1b, 1c, with the control unit 13 being connected to the gateway 10 and the gateway 10 being connected to the lighting devices 1a, 1b, 1c via a lighting bus or interconnect 15 or such like. The gateway 10 converts between one or more network communications protocols and a lighting control protocol of the lighting system 19, for communicating with the lighting devices 1a, 1b, and 1c over the lighting bus or interconnect 15. In this case the control unit 13 receives commands in the network communications protocol, and in response instructs the lighting devices 1a, 1b, and 1c by issuing corresponding instructions using a network communications protocol and sending them via the gateway 10 to be converted into the lighting protocol. For example, the control unit 13 may be implemented on a server or other unit on a local area network 20 of the environment 8. Alternatively, the control unit 13 may be implemented on the lighting side 1 of the gateway 10, connecting directly to the lighting bus or interconnect 15 (unlike what is illustrated). In this case the control unit 13 receiving commands in a network communications protocol, but issues corresponding instructions to the lighting devices 1a, 1b, 1c directly over the bus or interconnect 5 using the lighting protocol.

Note that as used herein, the term "command" does not necessarily imply that the lighting control command is acted upon by the receive side control unit 13 of the lighting system unconditionally, nor that this control unit 13 is a slave to the application 95 on the user terminal 3. Depending on implementation, the performance of the lighting function associated with the command may in fact be conditional on one or more criteria applied by the control unit 13 of the lighting system 19. For instance, the control unit 13 may be responsible for authenticating the user 5 to verify that he or she is authorized to control the lighting 1, and to act on the commands on condition of this authentication. As another example, the control unit 13 may be responsible for arbitrating between potentially conflicting commands from the terminals of a plurality of different users 5, 6.

Note also, in some embodiments the user terminal 3 is required to be found in the environment 8 in question in order to be allowed to control the lights 1a, 1b, 1c in that environment. For example, this condition may be evaluated based on an indoor location network, or based on a satellite based positioning system such as GPS. Alternatively it may be allowed that the lights 1a, 1b, 1c in the environment 8 can be controlled by a user terminal from a location 99 outside the environment 8, or that only certain authorized users are allowed to control the lights from the outside. The following will be described in terms of a user 5 and user terminal 3 within the same environment (e.g. same room) 8 as the lighting devices 1a, 1b, 1c being controlled, but it will be appreciated that this is not limiting in all possible embodiments.

There are a number of possible paths for performing the transmission of the lighting control commands from the lighting control application 95 on the user terminal 3 to the lighting control unit 13.

Figure 2:
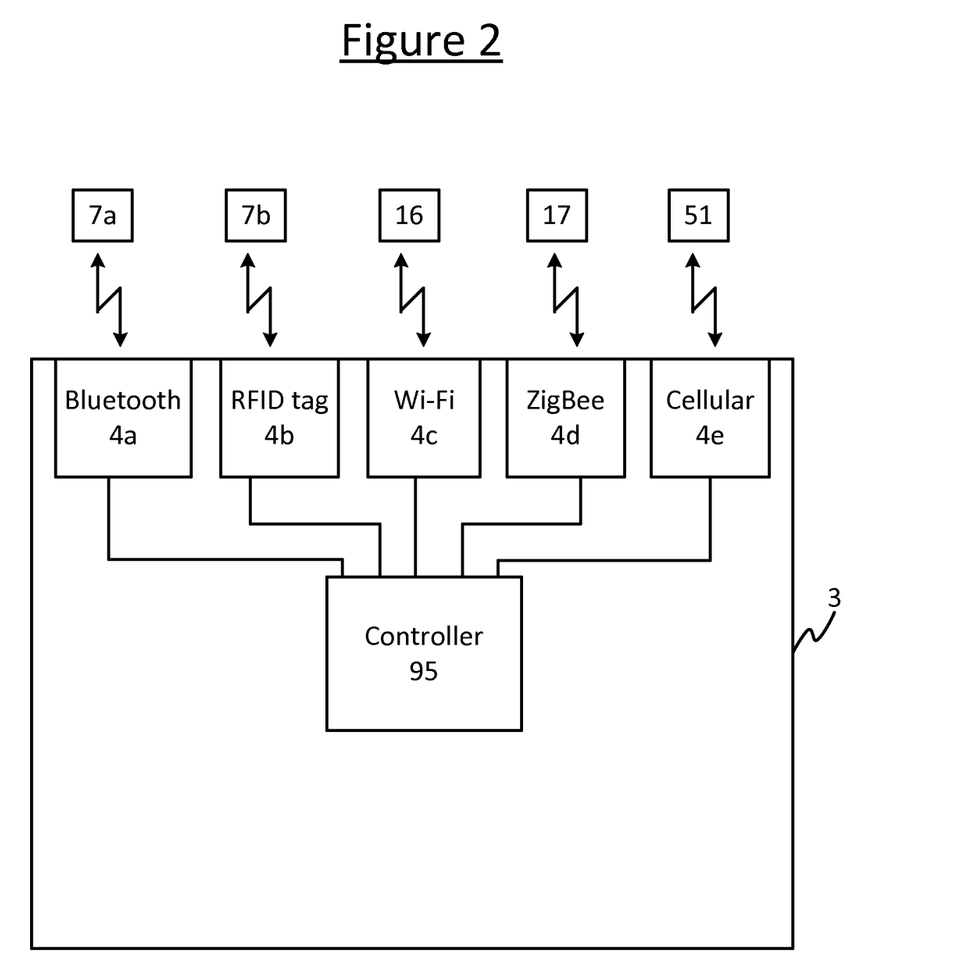
FIG. 2 is a schematic diagram of a controller device for remotely controlling the lighting system.

As illustrated in FIG. 2, the user terminal 3 comprises a plurality of transmitters 4 each for accessing a different respective communications interface of the system 90. In embodiments, some or all of these are wireless transmitters for transmitting to a different respective wireless interface. The controller application 95 is operable to use each of these transmitters 4 to transmit to the lighting system 19 via a different respective path, each path including the respective interface. In embodiments, one, some or all of the transmitters 4 is in fact a transceiver for transmitting and receiving via the respective interface, and the controller application 95 is also operable to use each of the transceivers to receive information back from the lighting system 19 via the respective interface, e.g. to receive the feedback discussed shortly. However, in alternative embodiments it is not excluded that the feedback could be received by a separate path than the corresponding transmission, and so while the following will be described in terms of transceivers 4, it will be appreciated that this is not limiting to all possible embodiments.

Note also that in some embodiments, some or all of the transceivers 4 may share some or all of their hardware resources (e.g. antenna(s) and/or power amplifier, etc.), but are nonetheless distinct in they employ different communications protocols. Alternatively, some or all of the transceivers 4 may comprise different hardware resources (e.g. different antennas and/or power amplifiers, etc.).

Some examples of the different possible interfaces and corresponding paths are now discussed. It will be appreciated that these are only examples. For instance, while FIG. 2 shows a user terminal 3 with five different transceivers for communicating with five different interfaces of the system 90, this is only for illustrative purposes and any given user terminal 3 may in fact be equipped with any two or more of these transceivers, and/or other types of transceiver for communicating with other types of interface.

In embodiments, one of the transceivers 4a is configured to communicate according to a local (short-range) RF technology such as Bluetooth. For instance, the room 8 may be equipped with a wall panel 2 comprising a corresponding Bluetooth interface 7a, coupled onwards to the gateway 10 of the lighting system 10. In this case the controller application 95 has the option of transmitting lighting control commands to the lighting system's control unit 13 via the Bluetooth interface 7a in the wall panel 2 and the gateway 10.

As another example, one of the transceivers 4b is configured to communicate according to a near-field communication (NFC) technology. For instance, this transceiver may take the form of an RF tag (sometimes called an RFID tag) which can communicate with a corresponding NFC interface 7b in a wall panel 2 installed in the environment 8 (either the same or a different panel as the Bluetooth interface 7a) when the user 5 swipes his or her terminal 3 against the NFC interface 7b. In this case, the NFC interface 7b is coupled onwards to the gateway 10 of the lighting system 19, and the controller application 95 has the option of transmitting lighting control commands to the lighting system's control unit 13 via the NFC interface 7b and the gateway 10.

As another example, the system 90 may comprise another local (short-range) RF interface in the form of a Wi-Fi access point 16, and one of the transceivers 4 of the user terminal 3 may comprise a corresponding Wi-Fi transceiver 4c. For instance, the Wi-Fi access point 16 may be implemented as part of a router 12 connected to the gateway 10 and/or connected direly to the lighting system's control unit 13 over a connection 14 such as an Ethernet connection. In this case the controller application 95 has the option of transmitting lighting control commands to the lighting system's control unit 13 via the Wi-Fi access point 16, router 12 and the gateway 10; or via the Wi-Fi access point 16 and then from the router 12 directly to the control unit 13 over the Ethernet connection 14 (or the like).

As another example, one, some or all of the lighting devices 1a, 1b, and 1c may each be equipped with yet another local (short-range) RF interface in the form of a ZigBee interface 17, and one of the transceivers 4 of the user terminal 3 may comprise a corresponding ZigBee transceiver 4d. In this case the controller application 95 has the option of transmitting lighting control commands to the lighting system's control unit 13 via the ZigBee interface 17, lighting bus/interconnect 15 and gateway 10 (in effect the lighting signals are sent directly to the lighting devices 10, but they may defer to the lighting system's control unit 13 to confirm whether the command is to be carried out, e.g. to check for authorization or for the purpose of arbitration).

As yet another example, one of the transceivers 4e may be a cellular transceiver for accessing a (wide area) mobile cellular network such as a 3GPP network (e.g. 3G or 4G), via an interface in the form of a base station 51 of the mobile cellular network 50 (a base station is also sometimes called a node-B in 3GPP terminology). For instance, the mobile cellular network may connect to a wide area public internetwork such as the Internet, which in turn connects to a local network 20 of the environment 8 via an internet gateway 30 and company IT structure of the local network 20 (if for example the environment 8 is an office). Further, a router 12 (either the same or a different router to that comprising the Wi-fi access point) connects the control unit 13 to the local network 20. In this case, the controller application 95 has the option of transmitting lighting control commands to the lighting system's control unit 13 via the cellular base station 51, mobile cellular network 50, public internet 40, internet gateway 31, company infrastructure 30, local network 20 and router 12 (and in embodiments via the gateway 10 between the router 10 and control unit 13 via the Ethernet connection 14).

Alternatively or additionally, the element 50 in FIG. 1 may represent an internet provider other than a cellular provider, and the element 51 may represent a wireless router that is not directly connected to the gateway 10 or lighting system control unit 13. For example, this may be a router comprising another Wi-Fi access point, accessed using the Wi-Fi transceiver 4c.

Given the various possibilities exemplified above, it can be appreciated that there are various possible paths by which the controller application 95 on the user terminal 3 can send lighting control commands to the lighting system 19, each path involving a different (wireless) interface.

However, in practical implementations problems may occur due to a variety of network issues, such as network instabilities, network down periods, network conflicts, network maintenance, network delays, network latency, timing errors, firewall conflicts, damages or broken parts, installation errors, design errors, hardware errors, software bugs, or even errors unintentionally caused by the users such as impatiently sending a series of commands which get buffered due to network latency, misunderstandings and more.

It would be desirable if the users 5, 6 in the room 8 were able to control the lighting system 19 in the room without any struggle, or at least with a reduced amount of struggle, even in the presence of network issues such as those above.

The current method to control lightings systems 19 from mobile device based apps relies on a connection from the mobile device 3 via a wireless connection using, in most cases, the IEEE 802.11 'Wi-Fi' standard for wireless communication or cellular mobile phone standards, which must remain active not to interfere with other functions of the mobile device 3.

However, due to network issues such as those mentioned above, the most favorable path for controlling a lighting system 19 may not always been available. As an example, it may be preferred to control the lighting system 19 via the preferred network path of the control device (e.g. via a personal, public network such as the cellular network 50), but sometimes access from this public network to the lighting system 19 may be blocked. In such circumstance the mobile device 3 will have to switch to a local network, which will reduce the capabilities of the mobile device 3 (e.g. smartphone). For this reason it may be preferable not to switch to the local network if this is not in fact currently a real requirement for controlling the lighting system 19. Preferably, the control device 3 (e.g. the smartphone) will first try to control the lighting device via my personal (public) network provider (e.g. cellular provider) and select this method if it appears to be available.

The following embodiments enable users 5, 6 present in a particular room 8, or the like, to control the various network-connected lights 1a, 1b, 1c and/or other lighting devices that might be controlled by the lighting system 19 (e.g. a beamer, shades, etc.) in that particular room 8 in a fast, hassle free and user friendly way, while simultaneously tracing and tracking all kind of network issues which may occur.

As discussed, the system 90 comprises a lighting system 19 which can be controlled by a wireless communication method such as Wi-Fi, Bluetooth, ZigBee, IR and/or NFC. The system 90 also comprises a gateway 10 which communicates directly with one or more wireless-controlled light points 1a, 1b, 1c, and may also comprise a fixed wall panel 2 to control the system via a wireless connection 7a, 7b between this panel 2 and the gateway 10. Depending on implementation, the system 90 may support the possibility to communicate between the wall panel 2 and mobile devices 3 and/or directly between mobile devices 3 and the gateway 10.

In embodiments, the system 90 may comprise a staggered infrastructure, such that the local gateway 10 in the room 8 connects to the lighting system's control unit 13, which may be made available via a local Wi-Fi interface 16 to the gateway 10 or any other communication protocol, like Bluetooth, ZigBee, IR and/or NFC that might be made available in the room 8; while a higher level in the infrastructure may associate the particular local gateways 10 with the control unit 13 and make this available and/or recognizable at higher levels 20, 30, 40 in the infrastructure with specific access protocols to ensure proper access to the particular local control gateways 10.

As such, the system 90 offers a variety of methods to connect mobile devices 3 of users 5, 6 in the room 8 towards the lighting system 19.

According to embodiments of the present disclosure, there is provided a protocol implemented in the lighting system 90 to enable verification as to whether desired user control commands fired by the user terminal 3 actually arrive at the lighting system's control unit 13 and are executed. The protocol implements one or more feedback loop which provide feedback such as path and timing information, so that the user control device (the user terminal 3) can select the most favorable path to control the lights 1a, 1b, 1c in a particular room 8 and, if required, to derive a suitable user control menu from this information.

The user terminal 3 is configured to "fire" (transmit) light control commands towards the lighting system 19 in a variety of connection paths such as, but not limited to, Wi-Fi, ZigBee, Z-Wave, JenNet-IP and more. The lighting system 19 is arranged to receive such light control commands fired by the user control device 3, via the various possible network paths; however some commands will arrive more slowly than others, or may not even arrive at all.

To accommodate issues such as this, the controller application 95 on the user terminal 3 is configured to include in the transmitted commands a network address of the user terminal 3 and an identification of the interface 7a, 7b, 16, 17, 51 for the respective transmission. This information may then be used by the control unit 13 of the lighting system 19 to confirm proper reception of the particular command string back to the user control device 3. Alternatively or additionally, the control unit 13 of the lighting system 19 may feedback information it can glean about the quality of the transmission, e.g. error rate and/or arrival time. For example in one embodiment, the lighting system 19 feeds back confirmation of arrive back to the user terminal 3 along with time information for the moment at which the particular control command has been received by the lighting system's control unit 13.

The applet 95 that runs on the user terminal 3 receives any feedback information submitted back by the lighting system 19, and is configured use this information to derive the most favorable path to submit future control commands to the lighting system 19. That is, the controller application 95 compares the two or more paths in dependence on the feedback. This comparison in dependence on the feedback may cover one or both of two possibilities: (i) feedback is successfully received on both or all paths and the information provided in the feedback is compared (e.g. to compare timing information and/or error rate), and/or (ii) feedback is not received on one or some of the paths, and this lack of feedback is indicative of the fact that the path is worse than a path for which feedback is successfully received.

In embodiments, as mentioned above, as part of initial communications (e.g. a handshake protocol) one or more of the interfaces 7a, 7b, 16, 17, 51 may additionally provide information on the interfaces that are available—either about itself or one or more of the other interfaces. For example this may comprise one of the interfaces advertising its own availability, providing information about its own capabilities (e.g. providing version information), advertising the availability of one or more of the other interfaces, or providing information about the capabilities of one or more others of the interfaces (e.g. version information). Such information about the availability of interfaces can be used by the controller application 95 on the user terminal 3 to determine which paths to probe for feedback. Alternatively or additionally, either or both of the information about the availability and/or the information about the capabilities of the interfaces can be used by the controller application 95 in addition to the above-described feedback to inform the decision as to which path to select for sending subsequent lighting control commands to the lighting system 19. Alternatively or additionally, either the information about the availability and/or the information about the capabilities of the interfaces can be used by the controller application 95 to determine the manner in which to connect to the relevant interface. E.g. a ZigBee interface 17 may provide information as to whether or not it has connection to any other ZigBee devices, and this can be used to determine whether there is a path to the lighting system 19 via ZigBee and/or whether there are possible multiple paths. The controller application 95 on the user terminal 3 can then use this information to determine whether to include such paths amongst those from which it requests feedback. As another example, a Wi-Fi interface 16 may provide information on the speed of the connection is can provide, and this information may be used by the controller application 95 to additionally inform the decision as to whether to select the Wi-Fi interface 16 to use to send lighting control commands.

Alternatively or additionally, the user terminal 3 may provide information on its own interface capabilities to the control unit 13 of the lighting system 19, and/or the control unit 13 of the lighting system may provide information on its interface capabilities to the user terminal 3. Such information can then be used to determine the manner in which the user terminal 3 connects to the lighting system 19; and/or may be used by the controller application 95 to determine which paths to probe for feedback, and/or to additionally inform the decision as to which path to select for sending subsequent lighting control commands to the lighting system 19 (in addition to the above-described feedback). For instance, during the handshaking protocols that occur the interfaces 7a, 7b, 16, 17, 51 and user terminal 3 may interchange their various interface capabilities, and the control unit 13 and/or controller application 95 may then derive the most favorable protocols and store this information for future use by the user terminal 3 when communicating with the particular lighting system 19 of the room 8 (such as when sending subsequent control commands). E.g. the user terminal 3 may provide its latest status change information (such as a software update) to the lighting system 19 and vice versa (such as the latest moment parts of the lighting system 19 have been modified).

Furthermore, in embodiments, the lighting system 19 may provide alternative user control features to the user terminal 3, the wall panel 2, and/or other user control devices 3 of other users 6 in the room 8 in dependence on one or more of the above described factors, such as: which interface 7a, 7b, 16, 17, 51 is selected for sending subsequent lighting control commands, the capabilities of the selected interface, and/or the capabilities of the lighting system 19. For example the control via various interfaces 7a, 7b, 16, 17, 51 may have somewhat different characteristics or capabilities, and some adaptations to the user interface may be appropriate to reflect this.

In yet further embodiments, after a time out error occurs since no to be expected feedback command has been received, the application 95 on the user terminal 3 may ask for manual feedback from the user 5 as to whether the lighting devices 1a, 1b, 1c, etc. were properly adjusted.

Note: the above has been described in terms of receiving feedback in response actual lighting control commands which actually act upon the lighting system 19 in order to control the lighting. For example, when the user 5 performs a user input to command an increase the dim level, then instances of the same command may be sent over the different paths to the lighting system's control unit 13, and in addition to their primary function of controlling the lights each of these instances of the command (if successfully received and/or execute) invokes the feedback about its respective path. Thus the sending of lighting control commands is additionally exploited as an opportunity to obtain feedback.

In embodiments, if their effect is defined in absolute terms, then the one or one or more duplicate commands may cause no particular issue in terms of controlling the lighting. For example, if the command is to set the dim level to 80% of maximum, the duplicate instance of the command simply tells the lighting system 19 to remain at the same level already caused by the first-received instances of that command. Alternatively, the commands are defined in relative terms such that the one or more duplicate instances would otherwise have an undesired cumulative effect (e.g. increase the dim level by 10% of the current level), then a mechanism may be implemented to prevent this. For instance, the controller 95 of the user terminal 3 may be configured to tag the duplicate instances with a unique tag (each instance of the same command has the same tag value, and different commands have different tag values). The control unit 13 of the lighting system 19 may be configured to then recognize the one or more duplicate instances and refrain from acting on such duplicates.

Note also however, that it is not essential in all possible embodiments that the messages used to probe the different paths for feedback are actual lighting control commands. Alternatively, these messages could for example be dedicated probe messages; or could be other messages such as status requests requesting some other information from the lighting system 19 (e.g. operating temperature, burning hours, etc.), where these are additionally exploited to invoke feedback on the paths.

According to another alternative or additional aspect of the present disclosure, similar feedback may be provided by the user terminal 3 towards the lighting system 19, such that the lighting system 19 may verify proper communication with the user terminal 3, and that the lighting system 19 may test its various interface possibilities towards the user control device 3 and may select the most favorable path to send messages to the user terminal.

Since another network path from the user device 3 towards the lighting system 19 may be more optimal than the network path from the lighting system 19 towards the user terminal 3, the lighting system 19 may select another communication path to the user terminal 3 than the communication path that is selected by the user terminal 3 towards the lighting system 19.

Furthermore, while the above has been described in terms of a lighting system comprising lighting devices which emit light, and lighting control commands which control the emitted light, note that the teachings above may alternatively or additionally be applied in relation to other types of environmental control system comprising one or more other types of environmental-control devices such as: one or more window treatments (e.g. electronically controlled blinds) and/or other daylight harvesting devices (e.g. a heliostat), and/or one or more HVAC devices (heating, ventilation and/or air-conditioning). Therefore anywhere in herein where features are described in terms of a lighting system, lighting devices and controlling lighting; any such features may equally apply to any system comprising a lighting system and/or other environmental-control system comprising one or more lighting devices and/or environmental-control devices (e.g. HVAC devices), for controlling the light and/or other environmental function(s) respectively.

It will be appreciated that the above embodiments have been described only by way of example. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A control device for controlling a lighting and/or environmental-control system over a communication system comprising one or more networks, the lighting and/or environmental-control system comprising one or more lighting devices for emitting light and/or one or more environmental-control devices for providing an environmental-control function, and the control device comprising:
    multiple transmitters each for transmitting to the lighting and/or environmental-control system via a different respective interface of the communication system; and
    a controller configured to use each of a plurality of the transmitters to transmit an instance of a same control command to the lighting and/or environmental-control system via each of a plurality of different paths, each of said instances of the same control command being for controlling the emitted light and/or environmental-control function, and each of said paths comprising a different respective one of the interfaces;
    wherein each instance of the control command invokes feedback from the lighting and/or environmental-control system to the control device if executed by the lighting and/or environmental-control system;
    wherein the controller is configured to compare the paths in dependence on the feedback, and based thereon to select which of the interfaces to use to transmit subsequent control commands to the lighting and/or environmental-control system for controlling the emitted light and/or environmental-control function, to time out if no feedback is received in response to any message, and to ask a user for manual feedback in the event of said time out; and
    wherein the feedback comprises confirmation that the instance of the control command was successfully executed by the lighting and/or environmental-control system.

2. The control device of claim 1, wherein the feedback comprises information relating to the transmission of a respective message over the respective path, said comparison comprising comparing the information received back in response to the transmission of the respective message over two or more of the respective paths.

3. The control device of claim 2, wherein said information comprises one or more of:
    information on a timing of the transmission of the respective message over the respective path,
    information on an error rate experienced the transmission of the respective message over the respective path, and/or
    information tracing the respective path travelled by the respective message.

4. The control device of claim 1, wherein the control device is a user terminal, and the control commands are instigated by user in response to user inputs entered through a user interface of the user terminal.

5. The control device of claim 1, wherein:
    in addition to said feedback, the controller is configured to receive additional information from one or more of the interfaces as to an availability of one or more of the interfaces and/or one or more capabilities of one or more of the interfaces, and/or to receive additional information as to one or more capabilities of the lighting and/or environmental-control system; and wherein:
    the controller is configured to select which of the interfaces to use to transmit the subsequent control commands to the lighting and/or environmental control system in further dependence on said additional information.

6. The control device of claim 1, wherein each of the interfaces uses a different respective access technology.

7. The control device of claim 1, wherein each of the transmitters is a wireless transmitter and each of the respective interfaces is a wireless interface.

8. A system comprising: the control device of claim 1, and the lighting and/or environmental-control system.

9. A method performed by a system comprising at least a processor, the method for controlling a lighting and/or environmental-control system over a communication system comprising one or more networks, the lighting and/or environmental-control system comprising one or more lighting devices for emitting light and/or one or more environmental control devices for providing an environmental-control function, and the method comprising: transmitting an instance of a same control command to the lighting and/or environmental-control system via each of a plurality of different paths, each of said instances of the same control command being for controlling the emitted light and/or environmental-control function, and each of said paths comprising a different respective interface of the communication system; receiving feedback invoked by one or more of the instances of the control command, wherein each instance of the control command invokes feedback from the lighting and/or environmental-control system to the control device if executed by the lighting and/or environmental-control system, and timing out if no feedback is received in response to any message, and asking a user for manual feedback in the event of said time out; comparing the paths in dependence on the feedback; based on said comparison, selecting which of the interfaces to use to transmit subsequent control commands to the lighting and/or environmental-control system for controlling the emitted light and/or environmental function; and wherein the feedback comprises confirmation that the instance of the control command was successfully executed by the lighting and/or environmental-control system.

10. A computer program for controlling a lighting and/or environmental-control system over a communication system comprising one or more networks, the lighting and/or environmental-control system comprising one or more lighting devices for emitting light and/or one or more environmental-control devices for providing an environmental-control function, and the computer program comprising code embodied on one or more non-transitory computer-readable storage media and configured so as when run on a control device to perform operations of: transmitting an instance of a same control command to the lighting and/or environmental-control system via each of a plurality of different paths, each of said instances of the same control command being for controlling the emitted light and/or environmental-control function, and each of said paths comprising a different respective interface of the communication system; receiving feedback invoked by one or more of the instances of the control command, wherein each instance of the control command invokes feedback from the lighting and/or environmental-control system to the control device if executed by the lighting and/or environmental-control system, and timing out if no feedback is received in response to any message, and asking a user for manual feedback in the event of said time out; comparing the paths in dependence on the feedback; based on said comparison, selecting which of the interfaces to use to transmit subsequent lighting control commands to the lighting and/or environmental-control system for controlling the emitted light and/or environmental-control function; and wherein the feedback comprises confirmation that the instance of the control command was successfully executed by the lighting and/or environmental-control system.

* * * * *